(12) United States Patent
Getachew et al.

(10) Patent No.: US 10,618,012 B2
(45) Date of Patent: Apr. 14, 2020

(54) METHOD FOR MANUFACTURING SELF-HEALING HYDROGEL-FILLED SEPARATION MEMBRANE FOR WATER TREATMENT

(71) Applicants: YALE UNIVERSITY, New Haven, CT (US); KOLON GLOBAL CORPORATION, Gyeonggi-do (KR)

(72) Inventors: Bezawit Asheber Getachew, New Haven, CT (US); Sang-ryoung Kim, Gyeonggi-do (KR); Jae-hong Kim, Madison, CT (US); Seung-joon Kim, Seoul (KR); Seong-kyun Yim, Seoul (KR); Moon-sun Kang, Gyeonggi-do (KR)

(73) Assignees: YALE UNIVERSITY, CT (US); KOLON GLOBAL CORPORATION, Gyeonggi-Do (KR)

( * ) Notice: Subject to any disclaimer, the term of this patent is extended or adjusted under 35 U.S.C. 154(b) by 91 days.

(21) Appl. No.: 15/508,728

(22) PCT Filed: Dec. 21, 2016

(86) PCT No.: PCT/KR2016/014986
§ 371 (c)(1),
(2) Date: Mar. 3, 2017

(87) PCT Pub. No.: WO2018/117287
PCT Pub. Date: Jun. 28, 2018

(65) Prior Publication Data
US 2019/0083938 A1 Mar. 21, 2019

(30) Foreign Application Priority Data
Dec. 19, 2016 (KR) .......................... 10-2016-0173872

(51) Int. Cl.
*B01D 67/00* (2006.01)
*B01D 71/38* (2006.01)
(Continued)

(52) U.S. Cl.
CPC ....... *B01D 67/0006* (2013.01); *B01D 65/108* (2013.01); *B01D 67/009* (2013.01);
(Continued)

(58) Field of Classification Search
None
See application file for complete search history.

(56) References Cited

U.S. PATENT DOCUMENTS

| | | | |
|---|---|---|---|
| 2003/0209487 A1* | 11/2003 | Belfort | B01D 67/0093 210/500.21 |
| 2005/0139545 A1* | 6/2005 | Taniguchi | B01D 65/02 210/500.41 |
| 2009/0176052 A1* | 7/2009 | Childs | B01D 67/0009 428/101 |

FOREIGN PATENT DOCUMENTS

| | | |
|---|---|---|
| JP | 2000-342936 A | 12/2000 |
| JP | 2001-269551 A | 10/2001 |
| JP | 2007-245060 A | 9/2007 |

OTHER PUBLICATIONS

Zhang, W. et al., "Membrane characterization using the contact angle technique I. methodology of the captive bubble technique", Desalination, vol. 79, pp. 1-12, 1990.
(Continued)

*Primary Examiner* — Krishnan S Menon
(74) *Attorney, Agent, or Firm* — The PL Law Group, PLLC

(57) ABSTRACT

A method for manufacturing a self-healing hydrogel-filled separation membrane for water treatment includes soaking a porous support comprising pores in a monomer solution to fill the pores with the solution, removing the excessively filled monomer solution from the porous support, and forming a hydrogel in the pores by crosslinking the monomer. The separation membrane does not require an additional repair process when damage occurs to the separation membrane and can exhibit superior self-healing effect and physical stability.

10 Claims, 12 Drawing Sheets

(51) Int. Cl.
*B01D 69/10* (2006.01)
*B01D 71/48* (2006.01)
*B01D 71/68* (2006.01)
*B01D 71/40* (2006.01)
*C02F 1/44* (2006.01)
*B01D 71/44* (2006.01)
*B01D 65/10* (2006.01)

(52) U.S. Cl.
CPC ............. *B01D 69/10* (2013.01); *B01D 71/38* (2013.01); *B01D 71/40* (2013.01); *B01D 71/44* (2013.01); *B01D 71/48* (2013.01); *B01D 71/68* (2013.01); *C02F 1/444* (2013.01); *B01D 2323/30* (2013.01); *B01D 2323/345* (2013.01); *C02F 1/447* (2013.01)

(56) References Cited

OTHER PUBLICATIONS

Zondervan, Edwin et al., "Statistical analysis of data from accelerated ageing tests of PES UF membranes", Journal of Membrance Science, vol. 300, pp. 111-116, 2007.

* cited by examiner

[Fig. 8]

Fig. 11A
Fig. 11B
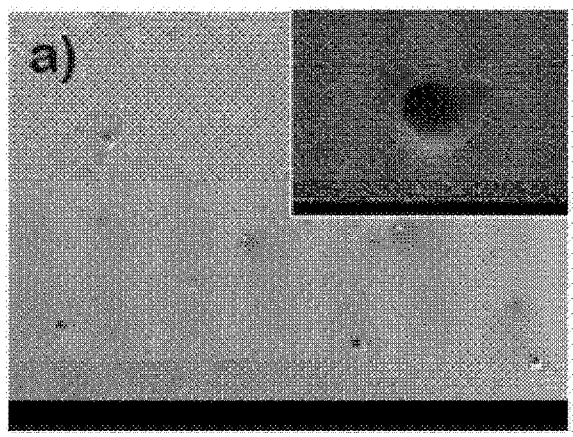 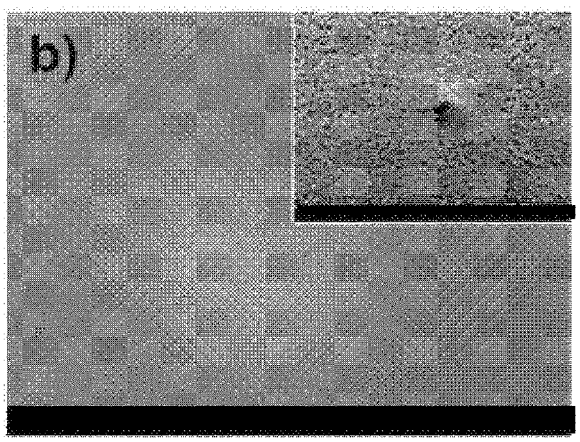
Fig. 11C
Fig. 11D
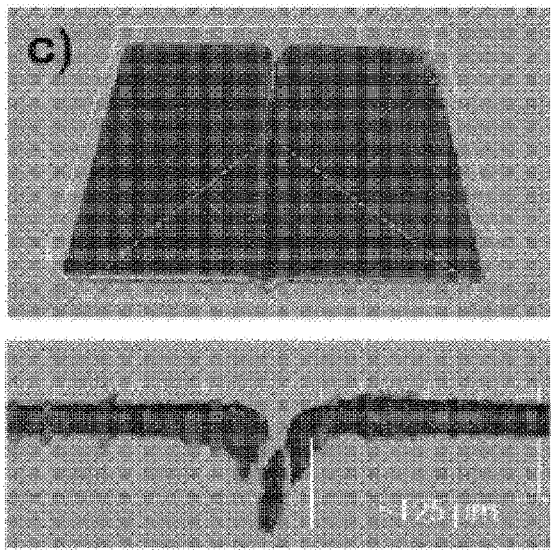 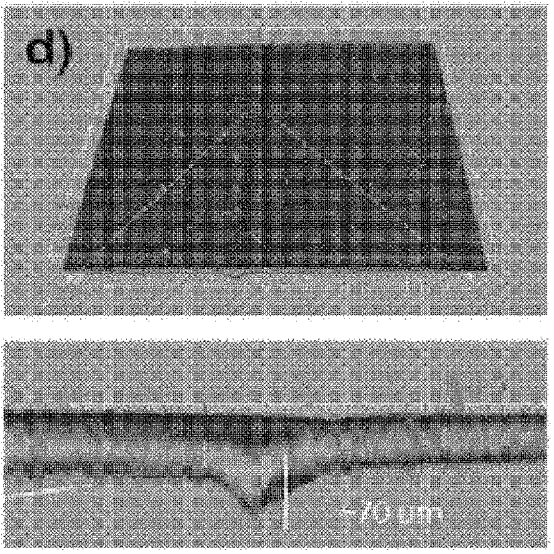

METHOD FOR MANUFACTURING SELF-HEALING HYDROGEL-FILLED SEPARATION MEMBRANE FOR WATER TREATMENT

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/014986, filed Dec. 21, 2016, which claims priority to the benefit of Korean Patent Application No. 10-2016-0173872 filed in the Korean Intellectual Property Office on Dec. 19, 2016, the entire contents of which are incorporated herein by reference.

TECHNICAL FIELD

The present disclosure relates to a method for manufacturing a self-healing hydrogel-filled separation membrane for water treatment.

BACKGROUND ART

Recently, demand on the water treatment technology is increasing globally due to the insufficiency of water resources and worsening of water quality. To meet this demand, improvement of existing water treatment facilities or introduction of new filtration devices and filtration processes is being attempted. However, the improvement of existing water treatment facilities or introduction of new advanced treatment facilities has many problems in site acquisition, cost, etc. Therefore, advanced water treatment processes using membrane filtrations, which are capable of providing stable water quality and can be operated and maintained easily, are being presented.

The membrane filtration water treatment method separates pollutants from raw water using a separation membrane having selective permeability. This is advantageous in that suspended materials of a certain size or larger included in the raw water can be removed surely. However, this process shows decrease in membrane filtration performance due to a layer formed by pollutants, solids, etc. on the surface of the separation membrane. In this case, the membrane filtration performance can be recovered by washing the separation membrane physically through water backwashing, air backwashing, etc. or chemically through decomposition or dissolution using chemicals.

Typically, a separation membrane used in the filtration device of a water treatment facility consists of hundreds or thousands of hollow fibers. The hollow fiber type separation membrane is a membrane which is capable of removing suspended materials, bacteria, etc. contained in raw water. But, it is important to occasionally check any damage to the separation membrane in order to ensure good water quality. If damage occurs on part of the separation membrane for some reason, it is highly likely that pollutants may leak out of the separation membrane. Accordingly, it is important to detect and deal with the damage to the separation membrane at an early stage of a membrane filtration process.

Technologies for detecting damage to the separation membrane in a membrane filtration process are disclosed.

For example, methods of injecting air to a primary side, which is in gas state whereas a secondary side is in liquid state, to detect damage to the separation membrane are disclosed in *Journal AWWA*, *Desalination* and *Journal of Membrane Science*. And, Japanese Patent Publication Nos. 2000-342936, 2001-269551 and 2007-245060 disclose methods for detecting damage to the separation membrane by injecting air to a primary side or a secondary side of a membrane module consisting of hollow fibers, with the primary side and the secondary side maintained in gas state and liquid state, respectively.

According to the above-described literature and patent documents, the damage to the separation membrane is detected in the state where the primary side and the secondary side of the membrane module are maintained at gas and liquid states or liquid and gas states, respectively. In such situations, compressed air moves from the gas state side to the liquid state side through the damaged part of the separation membrane due to differential pressure. However, the change in air pressure as the air moves from the gas side to the liquid side is not large due to resistance caused by density, partial air pressure, etc. Even if the damage to the separation membrane can be detected by the above-described methods, it is very difficult to find the damaged part of tens of micrometers from the module consisting of hundreds to thousands of hollow fibers. For this reason, the damaged module is replaced entirely in the actual process.

Meanwhile, a method of injecting liquid silicone and then curing the same or inserting a small nail or pin into the damaged hollow fiber membrane is used to repair the damaged hollow fiber membrane in a membrane filtration process.

However, the method of injecting and curing liquid silicone has problems in that a cassette of the relevant module must be placed on a worktable during the repair operation due to the fluidity of the silicone and in that the repair is carried out for a long time due to a long curing time, thereby causing increased time and labor and decreased workability. And, the method of inserting a nail or pin into the hollow fiber membrane has a problem in that, when the hollow fiber membrane is a reinforcing membrane, a small gap can be created between the membrane and the nail or pin, causing contamination of filtered water. In particular, for a pressurized module having a housing, the hollow fiber membrane cannot be blocked completely due to a narrow space created the fine edge or blade and the repaired membrane.

SUMMARY

The present disclosure is directed to providing a method for manufacturing a self-healing separation membrane for water treatment, which does not require checking and repair of a damaged part through an additional process when damage occurs to the separation membrane.

The present disclosure provides a method for manufacturing a self-healing separation membrane for water treatment, which includes: a step of soaking a porous support containing pores in a monomer solution to fill the pores with the solution; a step of removing the excessively filled monomer solution from the porous support; and a step of forming a hydrogel in the pores by crosslinking the monomer.

The monomer may be at least one selected from acrylamide, acrylamidoxime, acrylic anhydride, 2-acryloyloxyethyltrimethyl ammonium chloride, N-acryloxysuccinimide, acryloyl chloride, N-acryloyl tris(hydroxymethyl)methylamine, butyl acrylate and methacrylate, N,N-diethylacrylamide, N,N-dimethylacrylamide, 2-(N,N-dimethylamino) ethyl acrylate and methacrylate, N-[3-(N,N-dimethylamino) propyl]methacrylamide, n-dodecyl acrylate, n-dodecyl methacrylate, dodecyl methacrylamide, ethyl acrylate, ethyl methacrylate, 2-(2-ethoxyethoxy)ethyl acrylate and methacrylate, 2,3-dihydroxypropyl acrylate and methacrylate, glycidyl acrylate and methacrylate, n-heptyl acrylate and methacrylate, 1-hexadecyl acrylate and methacrylate, hydrazide, 2-hydroxyethyl acrylate and methacrylate, N-(hydroxymethyl)acrylamide, hydroxymethyl acrylate, N-(2-hydroxypropyl)methacrylamide, hydroxypropyl acrylate and methacrylate, methacrylamide, methacrylic anhydride, methacryloxyethyltrimethyl ammonium chloride, N-methacryloylacrylamide, 2-(2-methoxy)ethyl acrylate and methacrylate, N-methyl-N-vinylacetamide octadecyl acrylamide, octylacrylamide, octyl acrylate, octyl methacrylate, propyl acrylate and methacrylate, N-isopropylacrylamide, stearyl acrylate, acrylamido-2-methyl-1-propanesulfonic acid (AMPS), (3-acrylamidopropyl) trimethyl ammonium chloride (APTAC), methacrylic acid (MAA), acrylic acid (AA), poly(ethylene glycol) acrylate and poly(ethylene glycol) methacrylate.

The porous support may be formed of a polymer selected from polyethersulfone and polysulfone.

The hydrogel may be formed in the pores as the monomer is polymerized by UV.

The excessively filled monomer solution may be removed by compressing the porous support.

The monomer solution may contain 1-90 wt % of the monomer.

The pores may have an average size of 0.01-10 μm.

The method may further include a step of washing away the unreacted monomer after the hydrogel is formed in the pores.

A separation membrane manufactured according to the present disclosure does not require an additional repair process when damage occurs to the separation membrane and can exhibit superior self-healing effect and physical stability.

BRIEF DESCRIPTION OF DRAWINGS

FIGS. 11A, 11B, 11C, and 11D show the self-healing performance of separation membranes manufactured according to the present disclosure before/after damage.

DETAILED DESCRIPTION

Figure 1:
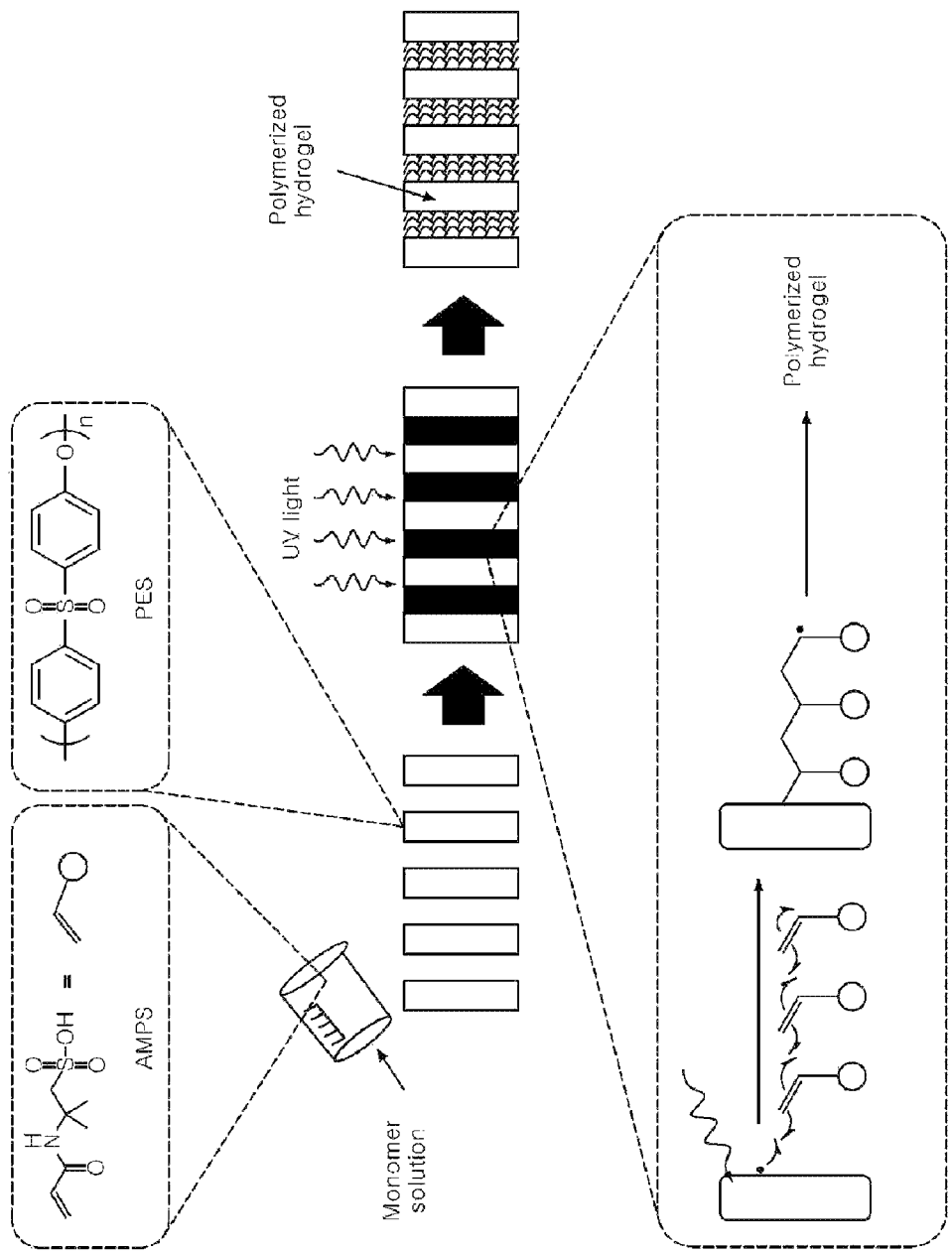
FIG. 1 schematically shows a procedure whereby polymerization is achieved by irradiating UV to a porous support according to the present disclosure.

Hereinafter, the present disclosure is described in detail. The terms or words used in the present disclosure and claims should not be interpreted as being limited to common understood meanings or those defined in dictionaries but be interpreted as having meanings that are consistent with their meaning in the context of the present disclosure based on the principle that an inventor can adequately define terms in order to best describe his/her invention. Accordingly, it is to be understood that the exemplary embodiments described in the present disclosure are only preferred specific examples of the present disclosure and do not represent all the technical spirit of the present disclosure and there may be various equivalents and modifications that can replace them at the time of the filing of this application.

A method for manufacturing a self-healing separation membrane for water treatment according to the present disclosure includes:

a step of soaking a porous support containing pores in a monomer solution to fill the pores with the solution;

a step of removing the excessively filled monomer solution from the porous support; and a step of forming a hydrogel in the pores by crosslinking the monomer.

Hereinafter, each step of the method for manufacturing a self-healing separation membrane for water treatment of the present disclosure is described in more detail.

First, a porous support containing pores is soaked in a monomer solution to fill the pores with the solution.

Specifically, the porous support may be formed of a polymer selected from polyethersulfone, polysulfone, polyphenylene oxide, polycarbonate, polyester, cellulose and a cellulose derivative. Most specifically, it may be formed of polyethersulfone or polysulfone.

The porous support may contain many pores having an average size of 0.01-10 μm, more specifically 0.2-2.0 μm. When the pore size of the porous support is smaller than the lower limit, a damaged part may not be self-healed enough because the injection of the monomer solution is not easy. And, when it exceeds the upper limit, pollutants may pass easily and the structure of the support may be deformed due to swelling of the hydrogel formed in the pores.

Specifically, the monomer solution for soaking the porous support may contain at least one selected from acrylamide, acrylamidoxime, acrylic anhydride, 2-acryloyloxyethyltrimethyl ammonium chloride, N-acryloxysuccinimide, acryloyl chloride, N-acryloyl tris(hydroxymethyl)methylamine, butyl acrylate and methacrylate, N,N-diethylacrylamide, N,N-dimethylacrylamide, 2-(N,N-dimethylamino)ethyl acrylate and methacrylate, N-[3-(N,N-dimethylamino)propyl]methacrylamide, n-dodecyl acrylate, n-dodecyl methacrylate, dodecyl methacrylamide, ethyl acrylate, ethyl methacrylate, 2-(2-ethoxyethoxy)ethyl acrylate and methacrylate, 2,3-dihydroxypropyl acrylate and methacrylate, glycidyl acrylate and methacrylate, n-heptyl acrylate and methacrylate, 1-hexadecyl acrylate and methacrylate, hydrazide, 2-hydroxyethyl acrylate and methacrylate, N-(hydroxymethyl)acrylamide, hydroxymethyl acrylate, N-(2-hydroxypropyl)methacrylamide, hydroxypropyl acrylate and methacrylate, methacrylamide, methacrylic anhydride, methacryloxyethyltrimethyl ammonium chloride, N-methacryloylacrylamide, 2-(2-methoxy)ethyl acrylate and methacrylate, N-methyl-N-vinylacetamide octadecyl acrylamide, octylacrylamide, octyl acrylate, octyl methacrylate, propyl acrylate and methacrylate, N-isopropylacrylamide, stearyl acrylate, acrylamido-2-methyl-1-propanesulfonic acid (AMPS), (3-acrylamidopropyl) trimethyl ammonium chloride (APTAC), methacrylic acid (MAA), acrylic acid (AA), poly(ethylene glycol) acrylate and poly(ethylene glycol) methacrylate. Most specifically, it may contain acrylamido-2-methyl-1-propanesulfonic acid (AMPS).

The monomer solution may contain specifically 1-90 wt %, more specifically 5-70 wt %, most specifically 20-50 wt %, of the monomer. When the content of the monomer is less than the lower limit, self-healing ability may be unsatisfactory because the hydrogel is not formed sufficiently and the penetration of fine pollutants cannot be prevented. And, when the content of the monomer exceeds the upper limit, the monomer solution may not be filled well in the pores because of increased viscosity.

A solvent may be used to dissolve the monomer. Specifically, water, a $C_1$-$C_6$ lower alcohol such as methanol, ethanol, propanol, etc., acetone, a cyclic ether such as tetrahydrofuran, a lower hydrocarbon such as hexane, heptane, etc., an aromatic compound or a hydride such as benzene, toluene, xylene, decalin, etc., a halogenated compound such as chlorobenzene, dichlorobenzene, 1,3,4-trichlorobenzene, etc., and so forth may be used.

The porous support may be soaked in the monomer solution for 1-24 hours to fill the monomer solution in the pores of the porous support.

Next, the excessively filled monomer solution is removed from the porous support soaked in the monomer solution.

In this step, the excessively filled monomer solution may be removed by compressing the porous support. Specifically, the excessive monomer solution may be removed by placing the support between two sheets and compressing it using a roller, etc. As the sheet, a transparent film such as polyethylene terephthalate (PET) or polyethylene (PE) may be used, although not being limited thereto.

Next, a hydrogel is formed in the pores by polymerizing the monomer in the porous support.

Specifically, in order to form the hydrogel, polymerization may be performed by irradiating UV to the porous support having the monomer filled in the pores. More specifically, UV with an intensity of 100-1,000 $\mu W/cm^2$ may be irradiated for 30-60 minutes.

Free radicals generated by the UV irradiation induce the polymerization of the monomer and the hydrogel is formed in the pores through graft polymerization.

As an example, a process of forming the hydrogel when the separation membrane is prepared with polyethersulfone as the porous support and acrylamido-2-methyl-1-propanesulfonic acid (AMPS) as the monomer is described in Scheme 1.

[Scheme 1]

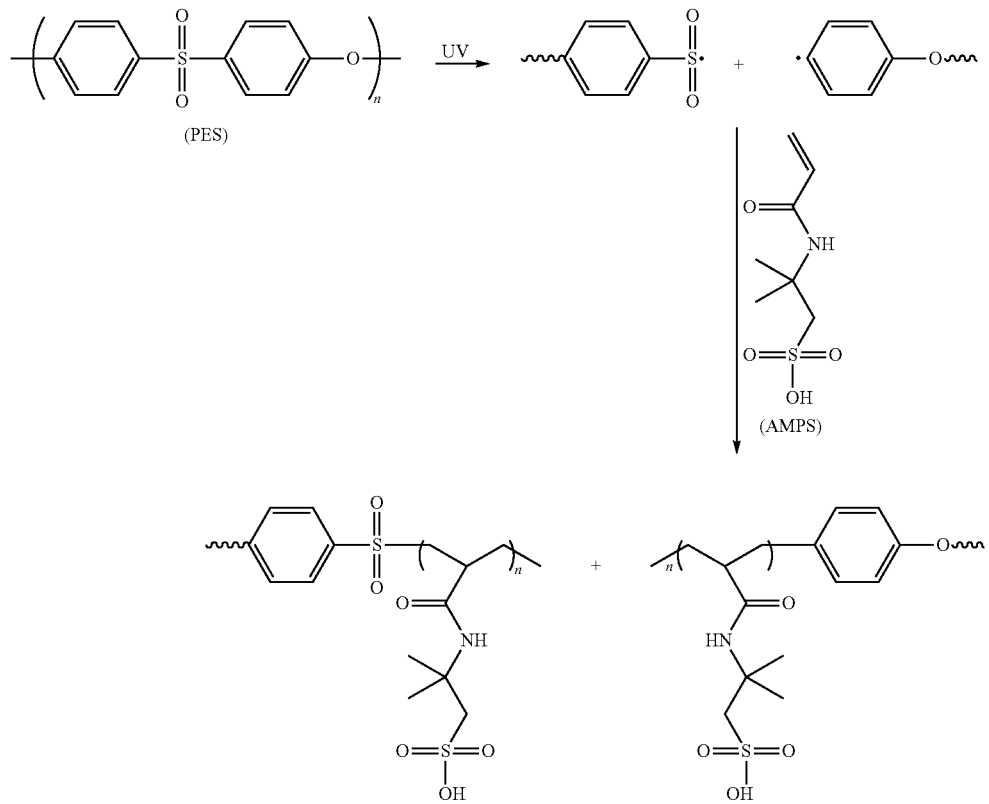

As shown in Scheme 1, free radicals are generated as the PES substrate undergoes homolytic chain cleavage. The free radicals induce covalent bonding between the PES and the AMP and initiate polymerization of the AMP monomer through graft polymerization. As a result, the pores of the support are filled with the hydrogel (see FIG. 1).

When the polymerization is conducted by irradiating UV, neither a photoinitiator nor an additional step for the reaction is necessary.

After the hydrogel is formed in the pores by irradiating UV, the unreacted monomer may be washed off using a solvent. As the solvent, water, acetone, methanol, DMF, etc. may be used.

The separation membrane manufactured by the above-described method does not require a step of detecting a damaged part of the separation membrane. When a fluid is flown through the damaged separation membrane, the damaged part can be self-healed as the hydrogel filled in the pores swells. Accordingly, the self-healing separation membrane according to the present disclosure does not require time and labor for repair and is economical because it can be used for a long period of time.

The above description is given only as an example of the technical spirit of the present disclosure and various modifications and changes may be made thereto by those of ordinary skill in the art to which the present disclosure belongs without departing from the essential feature of the present disclosure. Accordingly, the exemplary embodiments described in the present disclosure are provided not only to limit the technical spirit of the present disclosure but to describe it and the scope of the technical spirit of the present disclosure is not limited by the exemplary embodiments. The scope of the present disclosure should be interpreted by the appended claims and all the technical spirit within equivalent scopes should be interpreted to be included in the scope of the present disclosure.

Hereinafter, the present disclosure is described in detail through examples. However, the following examples are for illustrative purposes only and it will be apparent to those of ordinary skill in the art that the scope of the present disclosure is not limited by the examples.

Example 1

A 25 wt % monomer solution was prepared by mixing acrylamido-2-methyl-1-propanesulfonic acid (AMPS) with deionized water.

Figure 2:
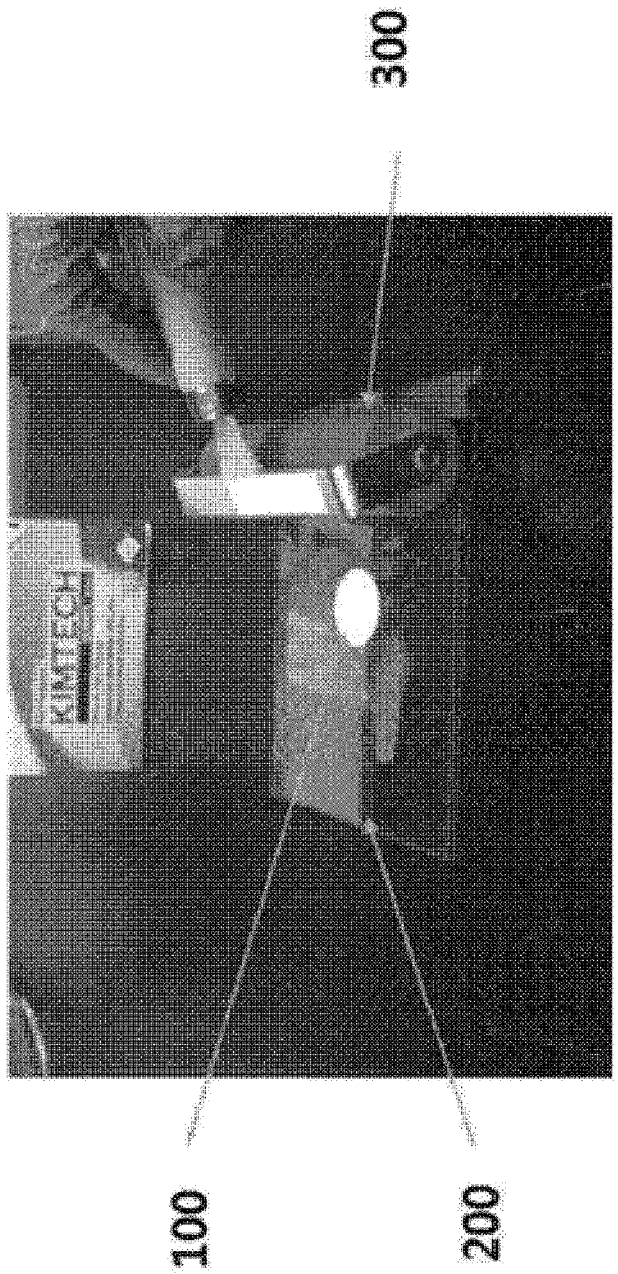
FIG. 2 shows a method of removing an excessively filled monomer solution during manufacturing of a separation membrane according to the present disclosure.

A polyethersulfone support having pores with a size of 0.2 μm was soaked in the prepared monomer solution for 12 hours. The resulting polyethersulfone separation membrane 100 was placed between two polyethylene terephthalate transparent sheets 200 and the excessively filled monomer solution was removed by compressing with a rubber roller 300 (see FIG. 2).

Then, for radical polymerization of the acrylamido-2-methyl-1-propanesulfonic acid (AMPS) monomer filled in the pores, polymerization was conducted for 30-60 minutes by irradiating UV with an intensity of 720 μW/cm².

Finally, a separation membrane wherein a hydrogel is filled in the pores was obtained by removing the unreacted monomer by washing the separation membrane 2 times with deionized water.

Example 2

A separation membrane was obtained in the same manner as in Example 1, except that the separation membrane was not washed with deionized water.

Example 3

A separation membrane was obtained in the same manner as in Example 1, except that a polyethersulfone support with a pore size of 0.45 μm was used.

Example 4

A separation membrane was obtained in the same manner as in Example 1, except that a polyethersulfone support with a pore size of 0.8 μm was used.

Comparative Example 1

A commercially available polyethersulfone support was used as a separation membrane.

Comparative Example 2

Commercially available acrylamido-2-methyl-1-propanesulfonic acid (AMPS) was used as a separation membrane.

Comparative Example 3

A separation membrane was obtained in the same manner as in Example 1, except that the acrylamido-2-methyl-1-propanesulfonic acid (AMPS) monomer filled in the pores was acid-catalyzed polymerized by heating at 80° C. instead of irradiating UV.

Measurement 1. Characterization of Separation Membranes

The surface characteristics of the prepared separation membranes were evaluated by Fourier transform infrared spectroscopy (FTIR; Thermo Nicolet 6700, USA).

X-ray photoelectron spectroscopy (XPS; PHI VersaProbe II XPS, USA) spectra were collected using a monochromatic 1486.7 eV Al Kα X-ray source with a 0.47 eV system resolution.

The surface morphology of the PES separation membrane and pore-filled separation membranes was observed by scanning electron microscopy (SEM; Hitachi SU-70, Japan). All separation membrane samples were dried overnight at 70° C. to remove any residual moisture. The samples were coated with a ~20 nm layer of chromium by vacuum sputtering (Denton Desk IV, USA) before the SEM imaging.

A confocal laser scanning microscope (CLSM; Nikon C2+, Japan) with 3D imaging software (IMARIS, Bitplane, Switzerland) was used for depth profiling and 3D imaging of the separation membranes. The separation membranes for confocal laser scanning microscopic imaging were prepared by using a monomer solution that contained 0.125 mg/mL fluorescent microparticles (1 μm diameter, Fluoresbrite®, Polyscience, Inc.). Serial optical sections (Z-stacks) for constructing 3D images were acquired using a 10× objective lens and a 488 nm excitation laser.

Measurement 2. Determination of Hydrogel Content in Separation Membranes

The hydrogel weight and the degree of grafting of the separation membranes were determined by the following equation.

$$\text{Mass gain} = \frac{W_p - W_s}{W_p} \times 100\% \qquad \text{[Equation 1]}$$

$$\text{Degree of grafting} = \frac{W_p - W_S}{A} \times 100\%$$

In Equation 1, $W_p$ (g) is the weight of the pore-filled separation membrane, $W_s$ (g) is the weight of the PES separation membrane, and A (cm$^2$) is the sample's top surface area.

The prepared separation membrane samples were dried overnight at 70° C. to remove any residual moisture before weighing.

Thermogravimetric analysis (TGA) was used to measure the hydrogel weight. The separation membrane sample was heated at a rate of 10° C./min up to 800° C. using a Q50 TGA analyzer (TA Instruments, USA) and the change in weight was measured.

Measurement 3. Separation Membrane Filtration Test

Figure 3:
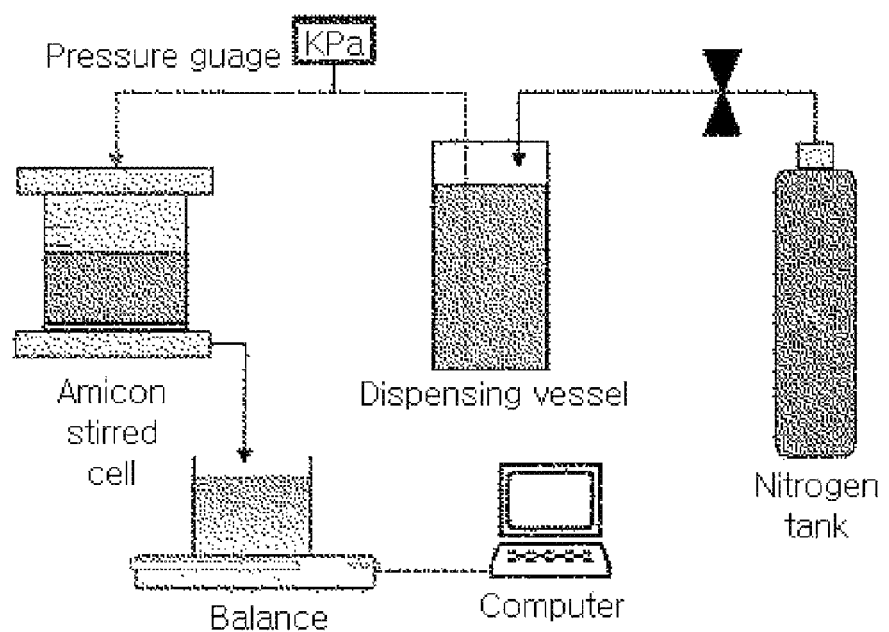
FIG. 3 shows a filtration test method of a separation membrane manufactured according to the present disclosure.

Filtration experiments were conducted with an Amicon stirred cell (Millipore, USA) with an effective filtration area of 4.1 cm$^2$, pressurized with nitrogen gas (see FIG. 3).

The experiments were conducted at 20 psi (138 kPa) with 450 rpm stirring. Fluorescent nanoparticles ($\lambda_{ex}$=441 nm, $\lambda_{em}$=486 nm; Fluoresbrite, Polyscience, Inc.) with a size of 50 nm, prepared to a concentration of 0.25 mg/mL, were used for rejection rate tests.

The molecular weight cut-off (MWCO) of the pore-filled separation membranes was determined by measuring the rejection rate of 1, 5, 10 and 30 kDa fluorescein-functionalized polyethylene glycol (mPEG-FITC, Creative PEG-Works, Chapel Hill, N.C.). The 1, 5, 10 and 30 kDa PEG's were prepared to concentrations of 87 mg/L, 1 g/L, 0.5 g/L and 1 g/L, respectively, and measured using a spectrofluorophotometer (Shimadzu RF-5031PC, Japan).

Measurement 4. Self-Healing Test of Separation Membranes

The self-healing property of the pore-filled separation membranes was evaluated by monitoring the rejection rate of separation membranes that were damaged with a needle with a maximum diameter of 450 μm. Water permeability and rejection rate were measured after damaging the separation membrane at three different locations with the needle. Then, the water permeability and rejection were measured again after soaking the membrane in deionized water for 2 hours. The conformational change of the damaged parts was observed by scanning electron microscopy and confocal laser scanning microscopy. The self-healing property of the separation membrane damaged by the needle was evaluated based on the conformational change of the damaged parts. Also, the self-healing property of the separation membrane damaged by a 37-μm thick microtome blade was evaluated by confocal laser scanning microscopy by passing a monomer solution containing fluorescent microparticles.

Test Example 1. Characterization of Pore-Filled Separation Membranes

Test Example 1-1. Fourier Transform Infrared (FTIR) Spectroscopy

Figure 4A:
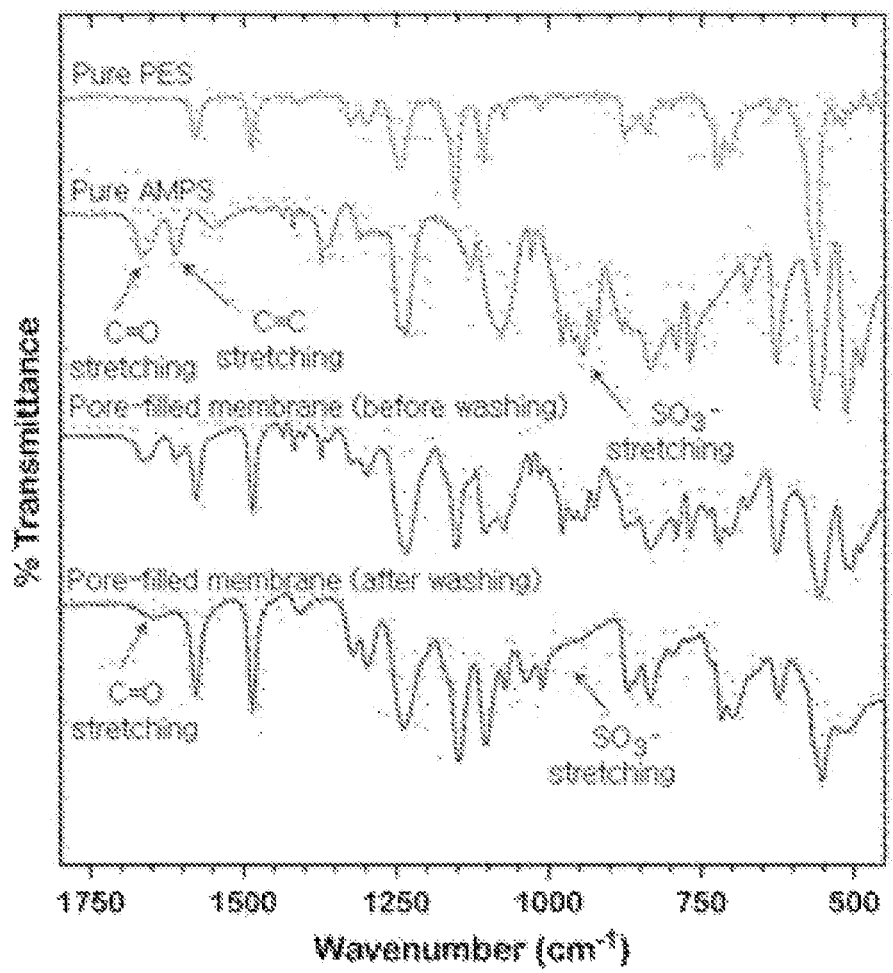
FIGS. 4A and 4B show the FTIR spectra and XPS analysis results of separation membranes manufactured according to the present disclosure.

For characterization of the pore-filled separation membranes, the FTIR spectra of Examples 1 and 2 and Comparative Examples 1 and 2 were measured as shown in FIG. 4A.

As seen from FIG. 4A, the polyethersulfone separation membrane of Comparative Example 1 showed sulfone peaks at 1150-1325 cm$^{-1}$ and aromatic peaks at 1510-1575 cm$^{-1}$ in the spectrum.

The spectrum of the acrylamido-2-methyl-1-propanesulfonic acid (AMPS) of Comparative Example 2 showed sulfonic acid peaks at 900-950 cm$^{-1}$ and carbonyl and alkene peaks at 1600-1650 cm$^{-1}$.

The unwashed separation membrane of Example 2 showed all the peaks observed in Comparative Examples 1 and 2.

For the washed separation membrane of Example 1, the alkene peaks disappeared and the intensity of the carbonyl and sulfonic acid peaks decreased.

Therefore, the presence of PAMPS on the separation membranes of Examples 1 and 2 was confirmed. In addition, it was confirmed that, after the washing in Example 1, all the PAMPS oligomers not covalently bonded were removed because the intensity of the carbonyl and sulfonic acid peaks decreased.

Test Example 1-2. X-ray Photoelectron Spectroscopy (XPS)

XPS analysis was conducted for the separation membranes of Example 1 and Comparative Example 1 for characterization of the separation membrane manufactured according to the present disclosure. The result is shown in FIG. 4B.

Figure 4B:
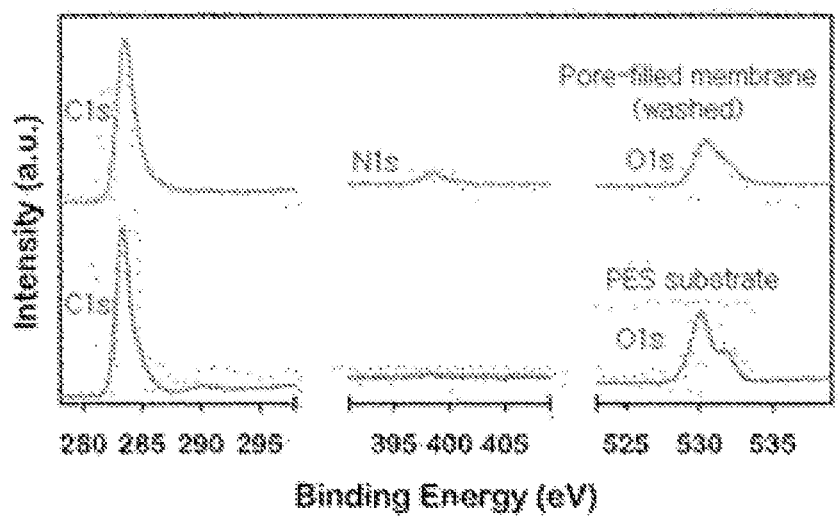

As seen from FIG. 4B, the separation membranes of Example 1 and Comparative Example 1 show C1s and O1s peaks at 283 eV and 530 eV, but the N1s peak at 399 eV appears only for Example 1.

This confirms that PAMPS was successfully graft polymerized on the PES separation membrane after washing.

Test Example 1-3. Scanning Electron Microscopy (SEM)

In order to confirm the microporous structure of the separation membrane manufactured according to the present disclosure, scanning electron microscopic analysis was conducted for the separation membranes of Examples 1 and 2 and Comparative Example 1. The result is shown in FIGS. 5A, 5B, and 5C.

Figure 5A:
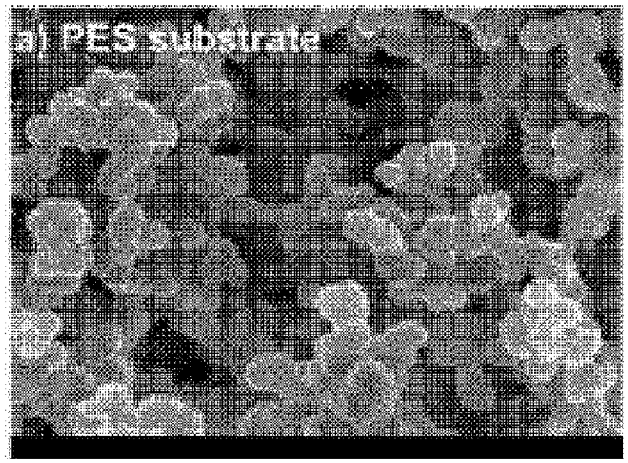
FIGS. 5A, 5B, and 5C show the scanning electron microscopic (SEM) images of separation membranes manufactured according to the present disclosure.
Figure 5B:
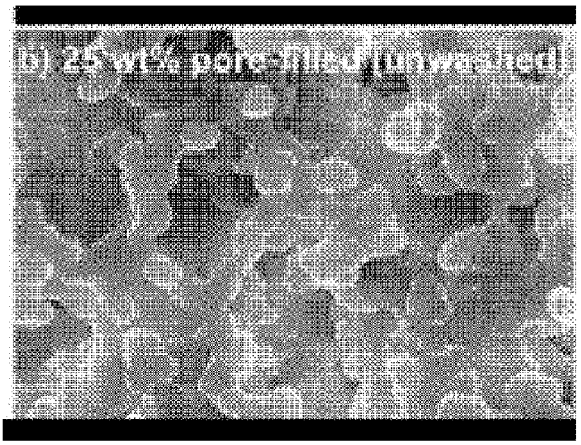
Figure 5C:
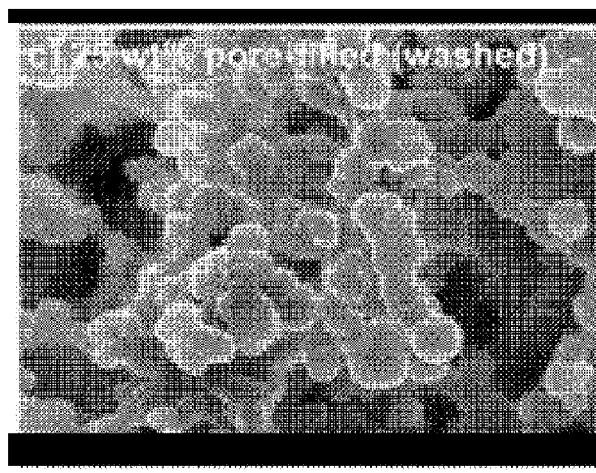

FIG. 5A is the scanning electron microscopic image of the separation membrane of Comparative Example 1, FIG. 5B is the scanning electron microscopic image of the separation membrane of Example 2 and FIG. 5C is the scanning electron microscopic image of the separation membrane of Example 1.

The pores in the separation membrane are observed from FIG. 5A. From FIG. 5B and FIG. 5C, it can be seen that the hydrogel was formed in the pores. From FIG. 5B, it can be seen that AMPS not covalently bonded to the PES separation membrane support is present in the pores.

Figure 6:
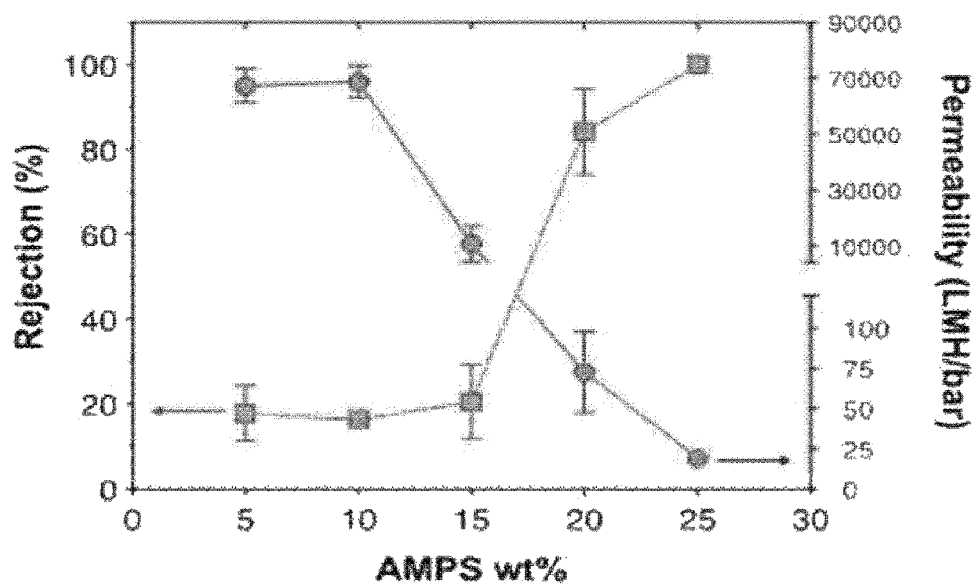
FIG. 6 shows the water permeability (water flux) and rejection rate of separation membranes manufactured according to the present disclosure depending on monomer content.

Test Example 2. Characterization of Separation Membrane Depending on Monomer Concentration Rejection rate and water permeability were evaluated by passing deionized water containing 50-nm fluorescent nanoparticles as pollutants through a separation membrane while varying monomer concentrations. The result is shown in FIG. 6. The experiment was conducted while increasing the concentration of the monomer acrylamido-2-methyl-1-propanesulfonic acid (AMPS) from 5 to 10, 15, 20 and 25 wt %.

From FIG. 6, it can be seen that, when the monomer concentration is low, the water permeability of the membrane is high but it is difficult to remove the fine pollutants.

It can be seen that the rejection rate is 90% or higher when the AMP concentration is at least 20 wt %.

Test Example 3. Formation of Hydrogel

The formation of the hydrogel in the separation membrane was confirmed by conducting TGA for the separation membrane manufactured in Example 1. The result is shown in FIG. 7.

Figure 7:
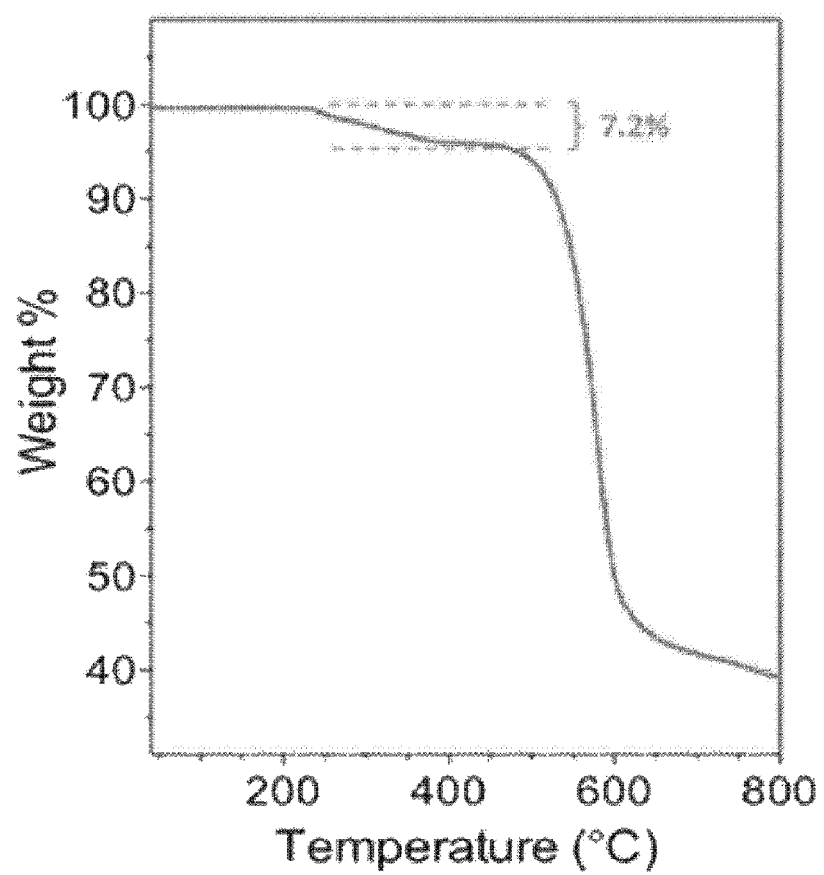
FIG. 7 shows the TGA result of a separation membrane manufactured according to the present disclosure.

From FIG. 7, it can be seen that the decomposition of the hydrogel begins at about 250° C. The weight fraction of the hydrogel was 7.2% and the degree of grafting was 350±30 μg/cm².

Test Example 4. Filtration Performance of Separation Membranes

Test Example 4-1. Rejection Rate

The rejection rate of the separation membranes of Examples 1 and 2 and Comparative Example 1 was measured. The result is shown in FIG. 8.

Figure 8:
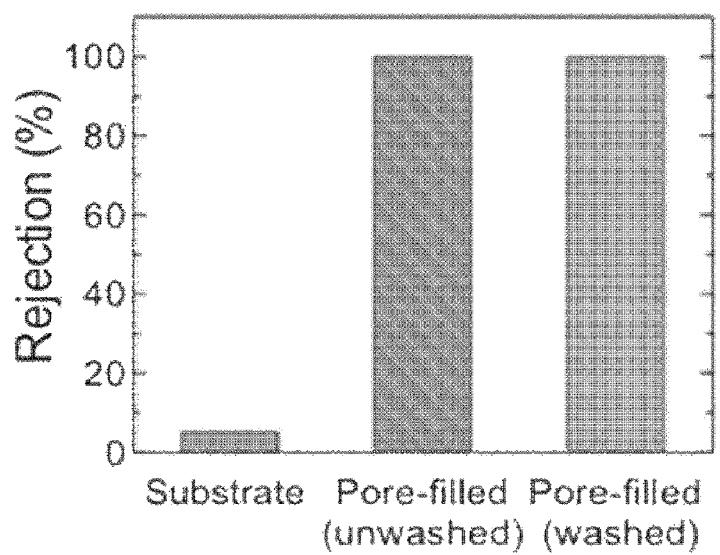
FIG. 8 shows the rejection rate of a separation membrane manufactured according to the present disclosure before and after washing.

From FIG. 8, it can be seen that the separation membranes of Examples 1 and 2 wherein the pores are filled with the hydrogel show remarkably higher rejection rates than the separation membrane of Comparative Example 1.

Test Example 4-2. Molecular Weight Cut-Off

The molecular weight cut-off (MWCO) of the separation membrane of Example 1 was measured. The result is shown in FIG. 9.

Figure 9:
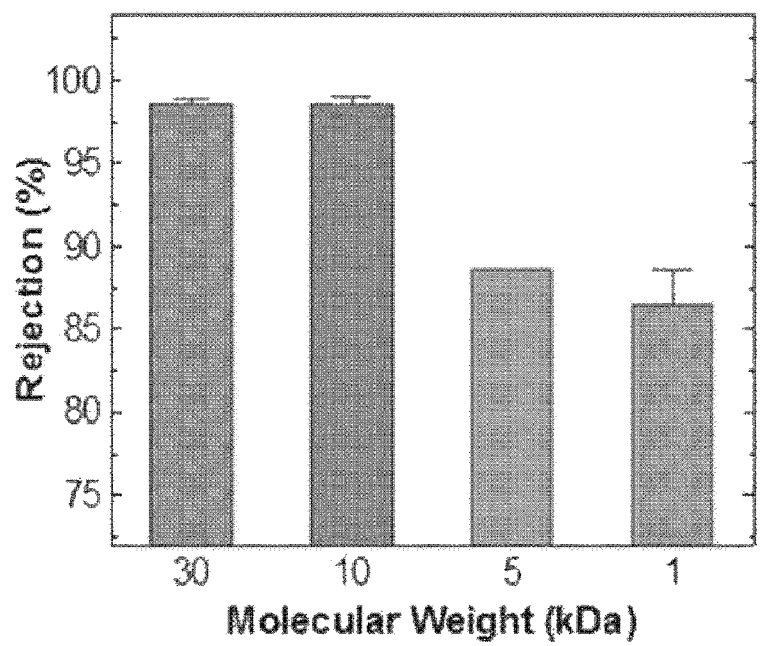
FIG. 9 shows the molecular weight cut-off of separation membranes manufactured according to the present disclosure.

As seen from FIG. 9, the molecular weight cut-off (MWCO) of the separation membrane was 10 kDa, which is in nanofiltration range.

Test Example 5. Self-Healing Property of Separation Membranes

Test Example 5-1. Rejection Rate and Water Permeability

In order to investigate the self-healing property of the separation membrane manufactured according to the present disclosure, the separation membranes with different pore sizes of Example 1 (0.2 μm), Example 3 (0.45 μm) and 4 (0.8 μm) were damaged with a needle. Then, after passing a fluid containing 50-nm fluorescent nanoparticles, the self-healing property of the separation membrane was determined by measuring rejection rate and water permeability. The result is shown in FIGS. 10A and 10B.

Figure 10A:
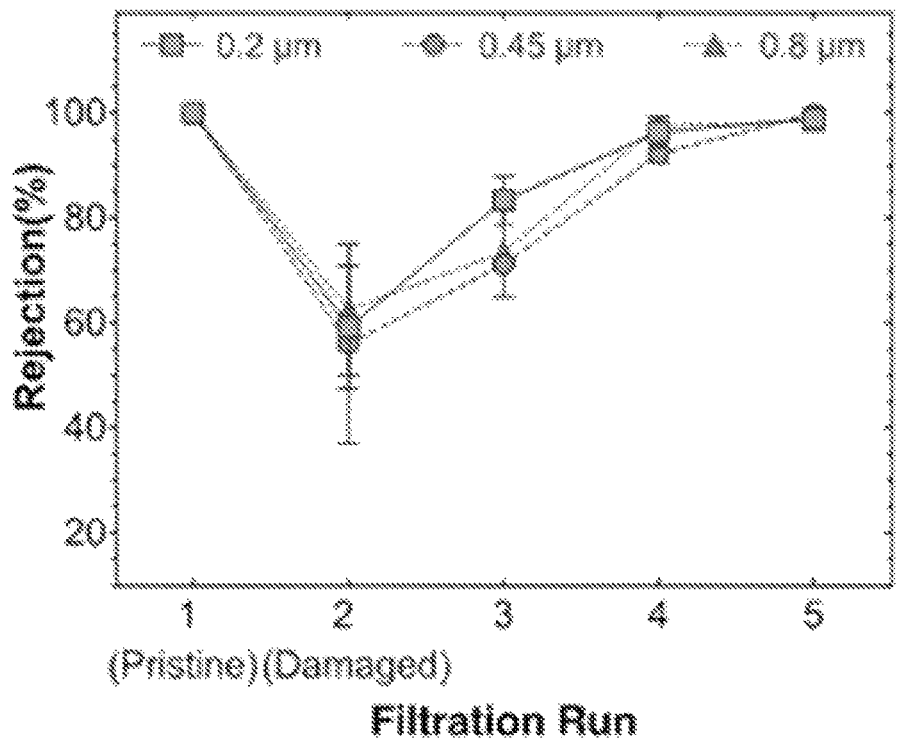
FIGS. 10A and 10B show the self-healing performance of separation membranes manufactured according to the present disclosure depending on the pore size of porous supports.
Figure 10B:
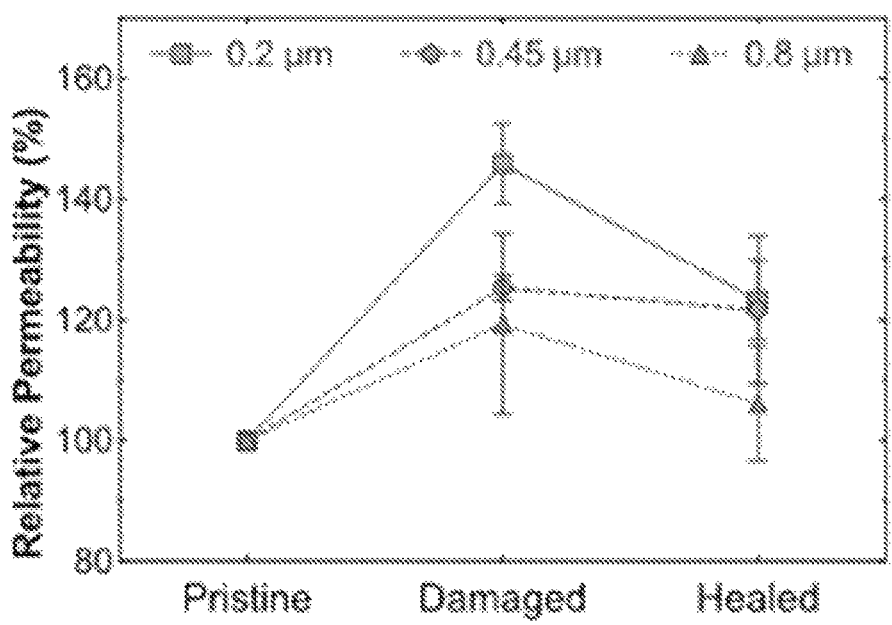

FIG. 10A shows the pollutant rejection rate of the separation membranes before/after the damage and FIG. 10B shows the relative water permeability of the separation membrane before/after the damage.

From FIG. 10A, it can be seen that the pollutant rejection rate of the separation membranes of the examples is recovered to their original levels after the separation membranes were damaged due to self-healing. The separation membrane of Example 1 with the smallest pore size shows fast self-healing.

Also, from FIG. 10B, it can be seen that the separation membranes of the examples show increased relative water permeability after damage of the separation membranes but it decreases again due to self-healing.

Accordingly, it was confirmed from this experiment that the separation membrane of the present disclosure could self-heal after being damaged because of the hydrogel formed in the separation membrane.

Test Example 5-2. Scanning Electron Microscopic (SEM) Analysis

SEM analysis was conducted to evaluate the self-healing property of the separation membrane of Example 1 after being damaged with a needle. The result is shown in FIG. 11A and FIG. 11B.

From FIG. 11A and FIG. 11B, it can be seen that the pinhole damage size of the damaged separation membrane decreased from 100 μm to 26 μm after being immersed in deionized water for 2 hours, suggesting that the separation membrane self-healed.

Test Example 5-3. Confocal Laser Scanning Microscopic (CLSM) Analysis

Confocal laser scanning microscopic (CLSM) analysis was conducted to evaluate the self-healing property of the separation membrane of Example 1 after being damaged with a microtome blade. The result is shown in FIG. 11C and FIG. 11D.

As seen from FIG. 11C and FIG. 11D, the damage depth of the damaged separation membrane decreased from 125 μm to 70 μm after being immersed in deionized water, suggesting that the separation membrane self-healed.

The self-healing effect of the separation membrane of the present disclosure confirmed from the results of the rejection rate measurement, scanning electron microscopy and confocal laser scanning microscopy is attributed to swelling of the hydrogel, hydrogen bonding between the polymer chains of the hydrogel and molecular interdiffusion.

Test Example 6. Physical Stability of Separation Membranes

In order to evaluate the physical stability of the separation membranes of Example 1 and Comparative Example 3, rejection rate (FIG. 12A) and change in water permeability depending on pressure (FIG. 12B) were measured.

Figure 12A:
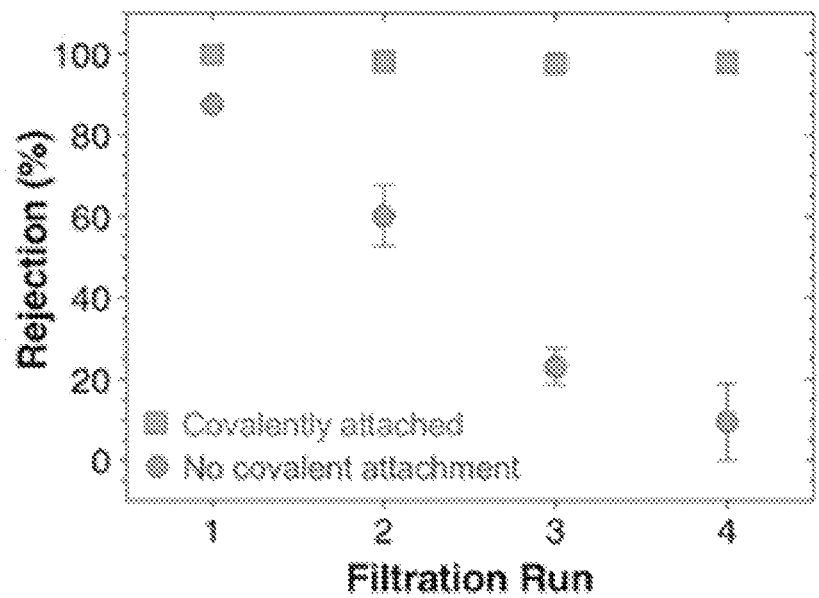
FIGS. 12A and 12B show a result of testing the physical stability of separation membranes manufactured according to the present disclosure.

As seen from FIG. 12A, whereas the separation membrane of Comparative Example 3 shows decreasing rejection rate with filtration runs, the separation membrane of Example 1 consistently shows a rejection rate which is 99% or higher. It is thought that the separation membrane of Comparative Example 3 does not have superior physical stability because PAMPS is not covalently bonded to the PES separation membrane support during thermal polymerization.

Figure 12B:
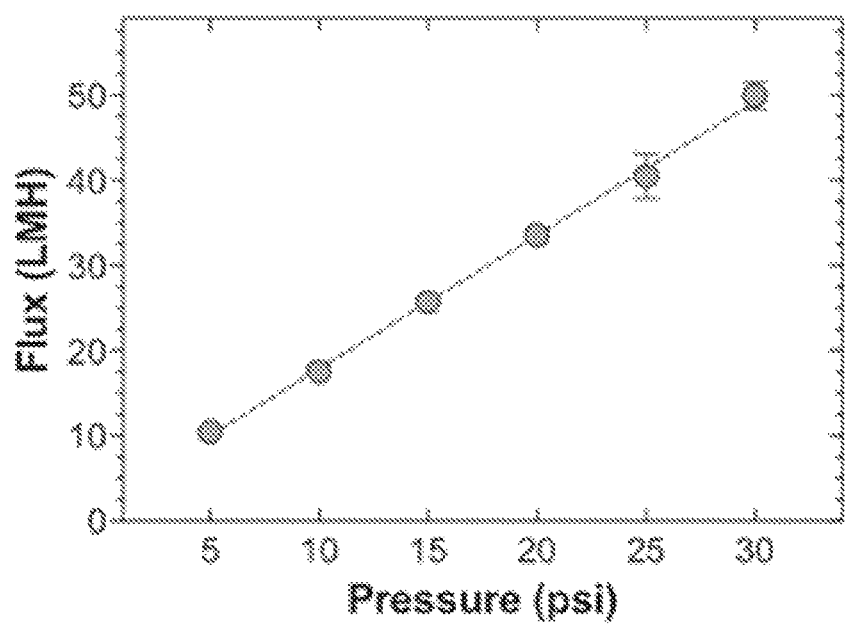

Also, from FIG. 12B, it can be seen that the separation membrane of Example 1 shows increasing water permeability in proportion to pressure. This indicates that the separation membrane can maintain physical stability under various pressures.

The invention claimed is:
1. A method for manufacturing a self-healing separation membrane for water treatment, the method comprising:
    soaking a porous support having pores in a monomer solution to fill the pores with the monomer solution;
    removing an excessively filled monomer solution from the porous support; and
    forming a hydrogel in the pores by irradiating UV to the filled monomer solution without a photoinitiator to form a covalent bonding between the porous support and monomers of the filled monomer solution and polymerize the monomers through graft polymerization, wherein the porous support is formed of a polymer selected from the group consisting of polyethersulfone and polysulfone;

the monomer solution comprises at least 20 wt % of the monomers; and the monomers are at least one selected from the group consisting of acrylamidoxime, N-acryloyl tris(hydroxymethyl)methylamine, N,N-diethylacrylamide, N,N-dimethylacrylamide, 2-(N,N-dimethylamino) ethyl acrylate, 2-(N,N-dimethylamino)ethyl methacrylate, N-[3-(N,N-dimethylamino)propyl]methacrylamide, dodecyl methacrylamide, N-(hydroxymethyl) acrylamide, N-methacryloylacrylamide, octylacrylamide, acrylamido-2-methyl-1-propanesulfonic acid (AMPS), and (3-acrylamidopropyl) trimethyl ammonium chloride (APTAC).

2. The method according to claim 1, wherein the excessively filled monomer solution is removed by compressing the porous support.

3. The method according to claim 1, wherein the monomer solution comprises 20 to 50 wt % of the monomers.

4. The method according to claim 1, wherein the pores have an average size of 0.01 μm to 10 μm.

5. The method according to claim 1, further comprising washing away an unreacted monomer after the hydrogel is formed in the pores.

6. The method according to claim 1, wherein the hydrogel is formed in the pores as the monomers are polymerized by irradiating UV with an intensity of 100 to 1,000 $\mu W/cm^2$ for 30 to 60 minutes, which induce the covalent bonding between the porous support and the monomers, and the polymerization of the monomers through the graft polymerization.

7. The method according to claim 1, wherein the monomers are at least one selected from the group consisting of acrylamidoxime, 2-(N,N-dimethylamino)ethyl acrylate, 2-(N,N-dimethylamino)ethyl methacrylate, acrylamido-2-methyl-1-propanesulfonic acid (AMPS), and (3-acrylamidopropyl) trimethyl ammonium chloride (APTAC).

8. The method according to claim 1, wherein the monomers are at least one selected from the group consisting of acrylamidoxime, 2-(N,N-dimethylamino)ethyl acrylate, 2-(N,N-dimethylamino)ethyl methacrylate, and (3-acrylamidopropyl) trimethyl ammonium chloride (APTAC).

9. The method according to claim 1, wherein the monomers are acrylamido-2-methyl-1-propanesulfonic acid (AMPS).

10. The method according to claim 1, wherein the monomer solution comprises 20 to 50 wt % of the monomers; and
the pores have an average size of 0.01 μm to 10 μm.

* * * * *